Figure 1:
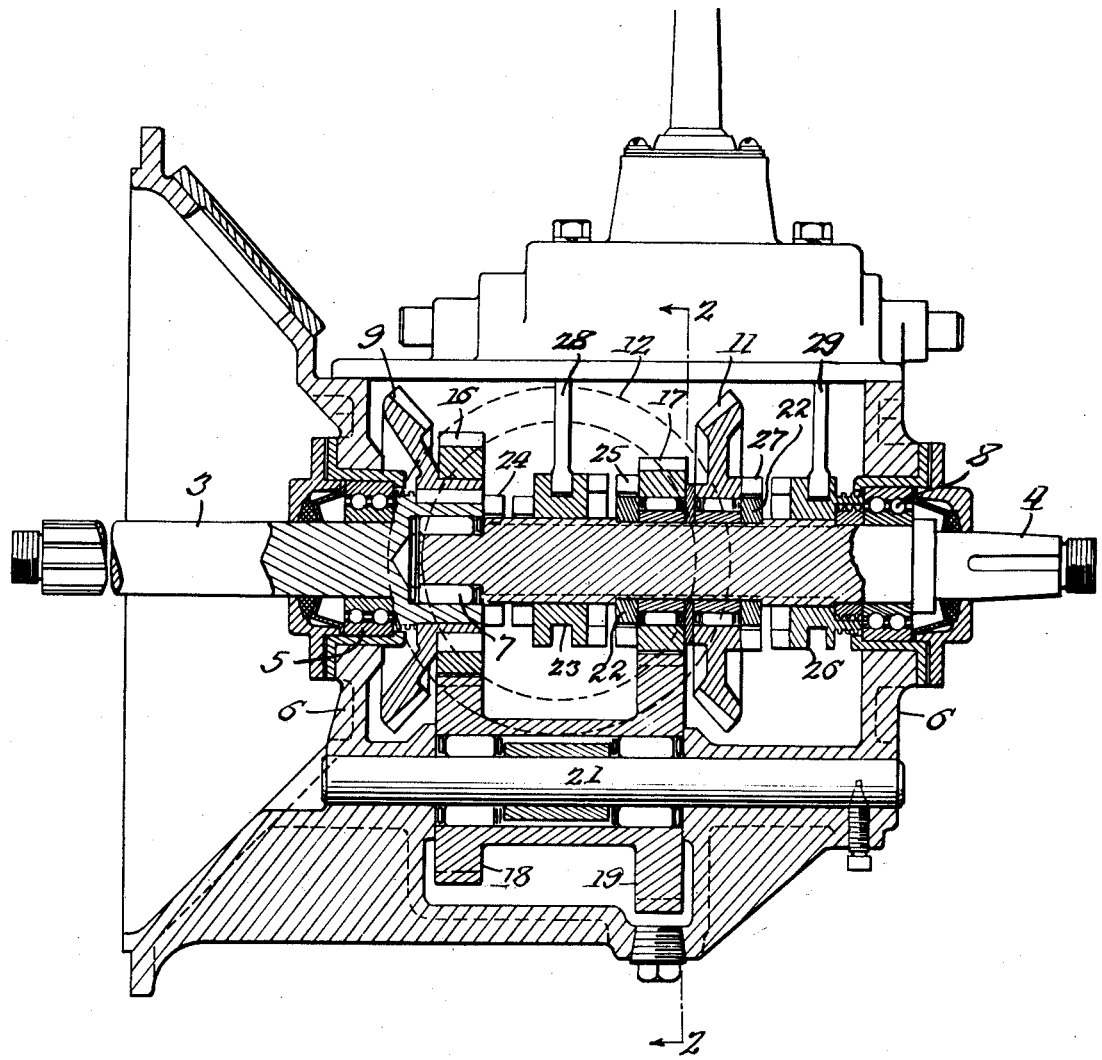

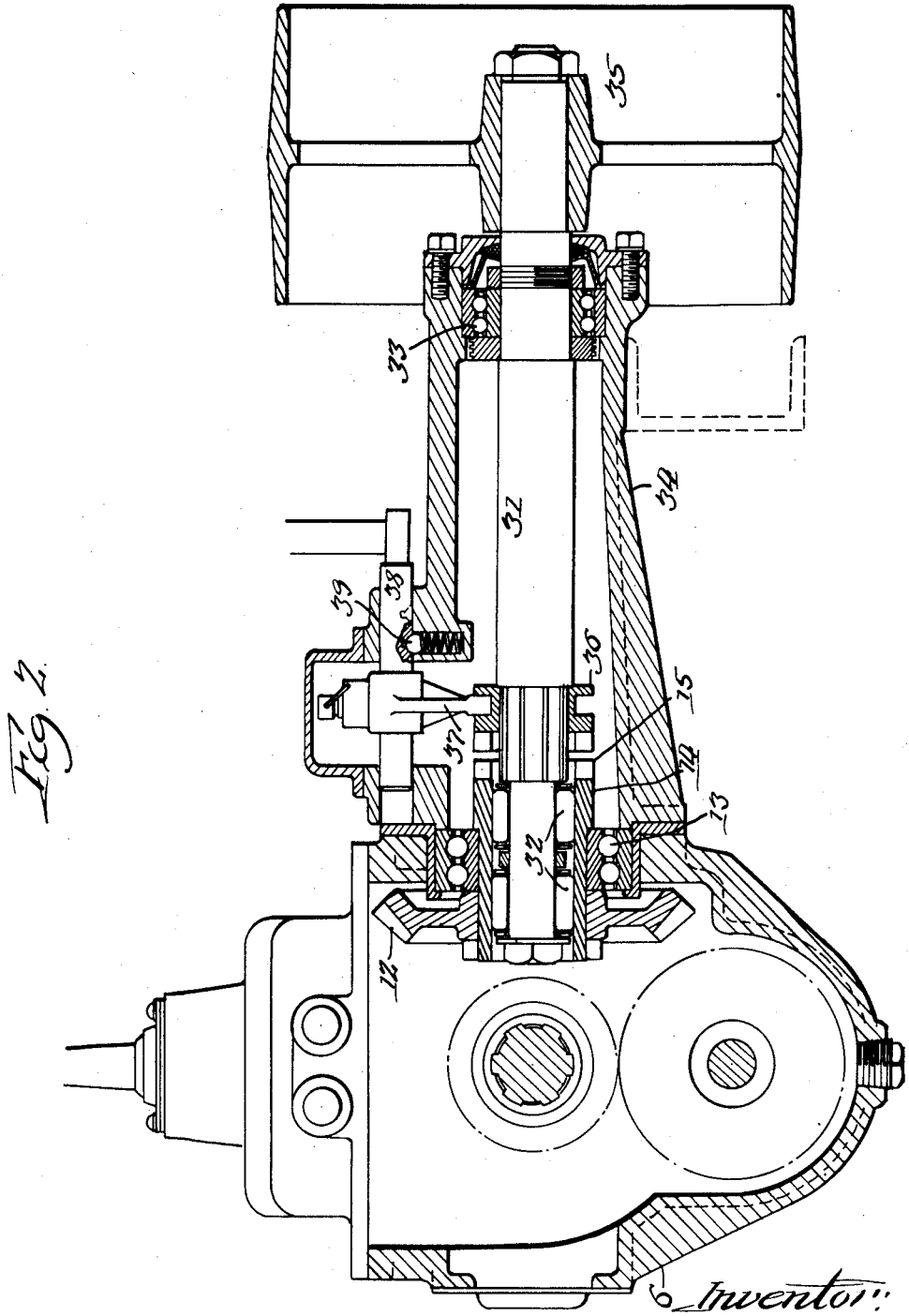

UNITED STATES PATENT OFFICE.

AXEL HJ. ASPROOTH, OF ROCKFORD, ILLINOIS, ASSIGNOR TO COTTA TRANSMISSION COMPANY, OF ROCKFORD, ILLINOIS, A CORPORATION OF ILLINOIS.

CHANGE-SPEED GEARING.

1,365,217.

Specification of Letters Patent.

Patented Jan. 11, 1921.

Application filed July 2, 1919. Serial No. 308,323.

*To all whom it may concern:*

Be it known that I, AXEL HJ. ASPROOTH, a citizen of the United States, residing at Rockford, in the county of Winnebago and State of Illinois, have invented certain new and useful Improvements in Change-Speed Gearing, of which the following is a specification.

This invention, relating in general to change speed gearing, has particular reference to a gearing transmission unit especially adapted for farm tractors. The primary object of the invention is to provide a transmission unit embodying a novel system of gearing especially adapted for the transmission of power for plowing, road work and a power pulley drive. And in the present exemplification of my improvements I have devised a change speed gearing of novel arrangement whereby I obtain two speeds forward, one reverse, and a power pulley drive in one direction. The low speed forward is direct from the engine and used for plowing and similar heavy work, and the second speed is obtained by step-up gearing from the driving shaft and intended principally as a road speed.

Another of the important objects of the invention is the provision of a change speed transmission including a driving, a driven and an intermediate bevel gear always in mesh, whereby the intermediate bevel gear effects the reversal of drive, and the employment of this reversing gear to drive the power pulley. This promotes exceptional compactness and the use of but very few gears for obtaining the forward and reverse drives and the driving of a power pulley.

I have also aimed to provide a change speed gearing of the character in mind constructed in such simple and novel manner as to be thoroughly practical from both manufacturing and service view points and which possesses various novel features of construction, the particular nature of which will be more fully pointed out hereinafter in the description.

Other objects and attendant advantages will be appreciated by those familiar with this art as the invention becomes better understood by reference to the following description when considered in connection with the accompanying drawings, in which—

Figure 1 is a vertical longitudinal sectional view through a change speed gearing embodying my improvements; and Fig. 2, a cross-sectional view taken substantially on the line 2—2 of Fig. 1.

Referring to Fig. 1, it will be seen that the present transmission unit is of the type having co-axial driving and driven shafts 3 and 4 respectively, the former of which is journaled in suitable bearings 5 on the transmission casing 6 and the latter journaled at its forward end on the roller bearing 7 in the rear end of the driving shaft 3 and at its rear end on bearing 8 in the casing 6. These bearings and the construction of the casing may obviously be of any suitable construction. A bevel gear 9 fixedly united to the driving shaft is in permanent driving connection with a bevel gear 11 loose on the driven shaft, through the agency of an intermediate bevel gear 12, Fig. 2, freely revoluble on the bearing 13. In the present instance, the intermediate bevel gear 12 is fixed to a sleeve 14, in turn secured to the inner ball ring and provided with a jaw toothed end 15, the purpose of which will be apparent hereinafter.

A spur gear 16 also rigidly united to the driving shaft is in constant driving connection with a spur gear 17 loose on the driven shaft, through the intermediary of the integrally united spur gears 18 and 19. These latter spur gears revolve loosely about a stationary countershaft 21, suitable anti-friction bearings being provided between the shafts and gears. The driven shaft 4 is splined substantially from end to end and the gears 11 and 17 are mounted thereon and held against lengthwise displacement by end collars 22 in the manner described in my copending application, Serial No. 308,325. A shiftable clutch element 23 splined on the driven shaft will when shifted to the left, Fig. 1, engage with the jaw teeth 24 on the driving shaft and thereby connect the latter directly to the driven shaft, and upon movement in the opposite direction will engage with the jaw teeth 25 on the spur gear 17 and connect the latter to the driven shaft. A second clutch element 26 also splined on the driven shaft is adapted to engage the jaw teeth 27 on the bevel gear 11 to connect the latter to the driven shaft. The clutch elements 23 and 26 are adapted to be shifted by means of forks 28 and 29 respectively, which in turn may be shifted by any suitable or preferred mechanism. In this particular instance, I employ a hand shifting mechanism of the kind described in my copending application, Serial No. 308,324 the particular construction of which it is not deemed necessary to illustrate herein.

When the shaft 3 is driven, (the clutches being in neutral position) all the gears will be revolved and the shaft 4 will remain idle. It will be manifest that when the clutch element 23 is shifted to the left viewing Fig. 1, the shaft 3 will be connected directly to the shaft 4, thus driving the latter direct from the engine at the first or low speed forward. Since this transmission is designed especially for use in farm tractors, there is a considerable reduction in the drive between the shaft 4 and the drive wheels, so that the direct engine speed will be properly reduced. Upon shifting the clutch element to the right the spur gear 17 will be connected to the driven shaft, thus driving the latter forward at a higher speed than that of the shaft 3 by reason of the step-up gearing 16—18—19. The clutch element 26 when engaged connects the bevel gear 11 to the driven shaft, thus reversing the drive of the engine speed, as will be obvious.

Coming now to the matter of driving the power pulley, it will be noted that I utilize the reversing gear for this purpose. As shown in Fig. 2, the power pulley shaft 31 journaled at its inner end in bearings 32 in the sleeve 14 and at its outer end in the bearing 33 in the lateral casing extension 34, is equipped at its outer end with a power pulley 35 and intermediate its ends with a splined clutch element 36. This clutch element is adapted to be shifted by means of the yoke 37 and shifting rod 38 into and out of engagement with the jaw teeth for the obvious purpose of connecting the power pulley shaft to and disconnecting it from the gear 12. A spring pressed ball 39 is used to hold the rod 38 in its several positions. From the foregoing, it will be manifest that the power pulley is driven from a reversing gear 12 which is always in mesh with the driving bevel gear 9 and the driven bevel gear 11, so that the gear 12 serves the double function of a reversing gear and a driver for the power pulley.

It is believed that the foregoing conveys a clear understanding of the objects prefaced above, and it should be understood that while I have illustrated but one working embodiment, various changes might be made in the construction and arrangement without departing from the spirit and scope of the invention, as expressed in the appended claims, in which—

I claim:

1. In a change speed gearing, the combination of co-axial driving and driven shafts, means for directly connecting said shafts, a bevel gear and a spur gear fixed to the driving shaft, means operative between the spur gear and the driven shaft for driving the latter in a forward direction at a different speed from that of the driving shaft, and means for driving the driven shaft from said bevel gear in a reverse direction.

2. In a change speed transmission, the combination of co-axial bevel gears, an intermediate bevel gear meshing with said bevel gears, a driven shaft about which one of the bevel gears is loosely revoluble, a spur gear associated with each bevel gear, said spur gears being of different diameter and one being loosely revoluble about the driven shaft, a pair of spur gears meshing with the first mentioned spur gears, and clutches for connecting the driven shaft with either the spur gear or the bevel gear loose thereon.

3. In a change speed transmission, the combination of a pair of co-axial bevel gears, an intermediate bevel gear meshing with said bevel gears, a power pulley shaft driven by said intermediate bevel gear, a spur gear associated with each of the co-axial bevel gears, said spur gears being of different diameter, a driving shaft, a driven shaft, one of the bevel gears and spur gears being loose on the driven shaft, the other bevel gear and spur gear being driven by the driving shaft, means for connecting to the driving shaft the spur gear loose thereon, and means for connecting to the driven shaft the bevel gear loose thereon.

4. In a change speed gearing, the combination of co-axial driving and driven shafts, a bevel gear and a spur gear fixed to the driving shaft, a bevel gear and a spur gear loose on the driven shaft, a bevel gear intermediate and meshing with said bevel gears, a pair of rigidly connected spur gears of different diameters meshing with said spur gears, a clutch on the driven shaft intermediate the spur gears for connecting either with the driven shaft, a power pulley driven by the intermediate bevel gear, and a clutch for connecting to the driven shaft the bevel gear thereon.

5. In a change speed transmission, the combination of co-axial driving and driven shafts, a bevel gear fixed to the driving shaft, a bevel gear loose on the driven shaft, an intermediate bevel gear connecting said bevel gears, a power pulley shaft co-axial with said intermediate bevel gear, a clutch for connecting the power pulley to said intermediate bevel gear, and clutches for connecting the driving shaft directly to the driven shaft and for connecting the driven shaft with the bevel gear thereon.

6. In a change speed gearing, the combination of coaxial driving and driven shafts, a bevel gear and a spur gear fixed to the driving shaft, a bevel gear and a spur gear loose on the driven shaft, the spur gears being of different diameters, an intermediate bevel gear meshing with said bevel gears, a pair of relatively fixed spur gears meshing with the spur gears on the driving and driven shafts, a clutch interposed between the spur gears and splined on the driven shaft for connecting the driving shaft directly to the driven shaft and the loose spur gear to the driven shaft, and a clutch splined on the driven shaft for connecting thereto the bevel gear loose thereon.

7. In a change speed transmission, the combination of a driving shaft, a driven shaft, a stationary countershaft, a bevel gear and a spur gear fixed to the driving shaft, a bevel gear and a spur gear loose on the driven shaft, a bevel gear intermediate and in mesh with the bevel gears, the spur gears being of different diameters, a pair of spur gears loose on the countershaft and in mesh with the aforesaid spur gears, means for connecting the driving shaft directly to the driven shaft, and means for respectively connecting to the driven shaft the bevel and spur gears loose thereon.

8. In a change speed transmission, the combination of a driving shaft, a driven shaft, a stationary countershaft, a bevel gear and a spur gear fixed to the driving shaft, a bevel gear and a spur gear loose on the driven shaft, a bevel gear intermediate and in mesh with the bevel gears, the spur gears being of different diameters, a pair of spur gears loose on the countershaft and in mesh with the aforesaid spur gears, means for connecting the driving shaft directly to the driven shaft, means for respectively connecting to the driven shaft the bevel and spur gears loose thereon, a power pulley shaft co-axial with the intermediate bevel gear, and a clutch for connecting the power pulley shaft to said intermediate bevel gear.

9. In a change speed transmission, the combination of co-axial driving and driven shafts, a bevel gear and a spur gear fixed to the driving shaft, a bevel gear and a spur gear loose on the driven shaft, a bevel gear intermediate and meshing with said bevel gear, a pair of rigidly connected spur gears of different diameters meshing with said spur gears, and clutches on the driven shaft for connecting thereto either its spur or bevel gear.

AXEL HJ. ASPROOTH.